United States Patent [19]
Becker et al.

[11] Patent Number: 5,379,379
[45] Date of Patent: Jan. 3, 1995

[54] MEMORY CONTROL UNIT WITH SELECTIVE EXECUTION OF QUEUED READ AND WRITE REQUESTS

[75] Inventors: Robert D. Becker, Shirley; Martin J. Schwartz, Worcester; Kevin H. Curcuru, Pepperell; Kenneth J. Eng, West Bridgewater, all of Mass.

[73] Assignee: Wang Laboratories, Inc., Lowell, Mass.

[21] Appl. No.: 580,365

[22] Filed: Sep. 6, 1990

Related U.S. Application Data

[63] Continuation of Ser. No. 213,395, Jun. 30, 1988, abandoned.

[51] Int. Cl.$^6$ .............................................. G06F 13/16
[52] U.S. Cl. ..................................... 395/250; 395/425; 395/725; 364/239.5; 364/242.91; 364/246.6; 364/DIG. 1; 364/937.01; 364/939.1; 364/969; 364/DIG. 2
[58] Field of Search ............... 364/DIG. 1, DIG. 2; 395/250, 425, 650, 725

[56] References Cited

U.S. PATENT DOCUMENTS

| | | | |
|---|---|---|---|
| 4,225,922 | 9/1980 | Porter | 364/200 |
| 4,354,232 | 10/1982 | Ryan | 364/200 |
| 4,516,199 | 5/1985 | Frieder et al. | 364/200 |
| 4,688,188 | 8/1987 | Washington | 364/900 |
| 4,783,736 | 11/1988 | Ziegler et al. | 395/425 |
| 4,792,926 | 12/1988 | Roberts | 365/189 |
| 4,833,651 | 5/1989 | Seltzer et al. | 365/189.07 |
| 4,864,543 | 9/1989 | Ward et al. | 365/221 |
| 4,933,901 | 6/1990 | Tai et al. | 365/189.07 |
| 5,034,922 | 7/1991 | Burgess | 365/189.07 |
| 5,097,442 | 3/1992 | Ward et al. | 365/78 |

Primary Examiner—Thomas G. Black
Assistant Examiner—Maria N. Von Buhr
Attorney, Agent, or Firm—Kenneth L. Milik

[57] ABSTRACT

A memory control unit (MCU) 22 includes a first interface for interfacing the memory control unit to one or more memory units; a second interface for interfacing the memory control unit to a system bus, including a system data bus for expressing information units, including memory read and write requests, and a system address bus. The MCU further includes logic, responsive to a write request from the system bus, for storing one or more information units within a memory unit at an address specified by the system address bus. The storing logic includes write request receiving and buffer logic having a plurality of storage locations for storing received write requests and associated write addresses prior to the execution of the write requests. The MCU further includes logic, responsive to a read request from the system bus, for reading one or more information units from a memory unit at a location specified by the system address bus. The reading logic includes read request receiving and buffer logic having a plurality of storage locations for storing received read requests and associated read addresses prior to the execution of the read requests. The memory control unit further has logic for comparing a received read address to write addresses stored in the write address buffer, the comparing logic having an output for indicating, when asserted, the occurence of the reception of a read address having a value within a predetermined range of values of one of the stored write addresses.

26 Claims, 10 Drawing Sheets

| 00 | 03 04 | 11 12 | 15 16 | 31 |
|---|---|---|---|---|
| RESVD | TARGET 8 | MESSAGE TYPE 4 | 2-BYTE MESSAGE 16 | |

FIG. 4a

| 0 | 3 4 | 11 12 | 15 16 | 31 |
|---|---|---|---|---|
| RESVD | CPU ID 8 | COMMAND 4 | 2-BYTE MESSAGE 16 | |

FIG. 4b

| 0 | 3 4 | 11 12 | 15 16 | 19 20 | 31 |
|---|---|---|---|---|---|
| RESVD | SBI ID 8 | COMMAND 4 | IOC ID 4 | SPARE 12 | |

FIG. 4c

| 0 | 3 4 | 11 12 | 15 16 | 31 |
|---|---|---|---|---|
| RESVD | CPU ID 8 | COMMAND 4 | 2-BYTE MESSAGE 16 | |

FIG. 4d

| 0 | 3 4 | 11 12 | 15 16 | 19 20 | 31 |
|---|---|---|---|---|---|
| RESVD | SBI ID 8 | COMMAND 4 | IOC ID 4 | SPARE 12 | |

FIG. 4e

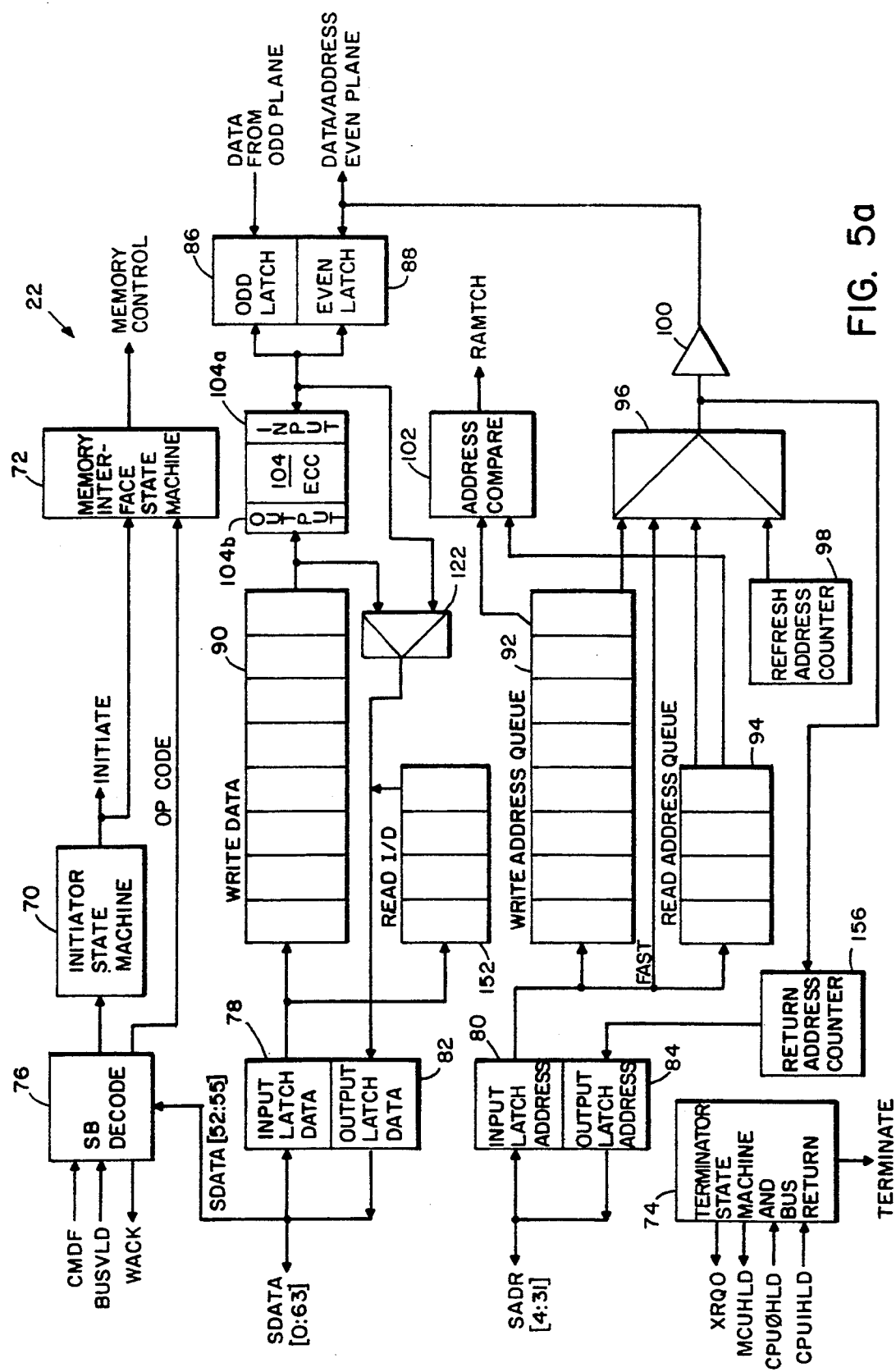

READ ADDRESS MATCH SEQUENCE

DOSET SUBROUTINE

MEMORY CONTROL UNIT WITH SELECTIVE EXECUTION OF QUEUED READ AND WRITE REQUESTS

This is a continuation of copending application(s) Ser. No. 07/213,395 filed on Jun. 30,1988, now abandoned.

FIELD OF THE INVENTION

This invention relates generally to an information processing system and, in particular, to a memory control unit for coupling a system memory to a high speed, non-interlocked system bus.

BACKGROUND OF THE INVENTION:

In an information processing system which employs a central system memory for storing information units, such as operands and instructions, an important consideration is the coupling of the system memory to a central system bus. In order to achieve and maintain a desired system bus bandwidth it is important that data read and write operations which access the system memory occur in a rapid manner. It is also important, for those systems which employ one or more system bus units, or bus connections, that substantially simultaneous multiple read and write accesses which target a given memory location occur such that the read and write operations are correctly sequenced. That is, if one bus connection desires to read a given memory location while another bus connection desires to write the same location the sequencing of these two operations must be such that the data read reflects the current state of the data.

Related to both of the above considerations is an underlying goal of providing the data to a requesting bus connection without the introduction of errors resulting from hard or soft memory storage device errors. In this regard it has been known to provide additional memory storage devices to store error correction and detection syndrome bits which advantageously correct single bit errors and detect multiple bit errors occurring in data words stored within the system memory. It has also been known to provide, for memory systems which employ dynamic random access memories (DRAM), error "sniffing" and "scrubbing" techniques which detect and correct errors during the required memory refresh cycles.

It can be realized however that error detection and correction techniques require some finite amount of time to accomplish. During a read of the system memory this additional time is typically incurred for each memory access, resulting in a longer access cycle and a consequent reduction in the overall bandwidth of the system bus.

SUMMARY OF THE INVENTION

The foregoing problems are overcome and other advantages are realized by an information processing system constructed and operated in accordance with the invention. In accordance therewith a memory control unit comprises first interface means for interfacing the memory control unit to one or more memory units; second interface means for interfacing the memory control unit to a system bus, including a system data bus for expressing information units, including memory read and write requests, and a system address bus; means, responsive to a write request from the system bus, for storing one or more information units within a memory unit at an address specified by the system address bus, the storing means comprising write request receiving and buffer means having a plurality of storage locations for storing received write requests and associated write addresses prior to the execution of the write requests; and means, responsive to a read request from the system bus, for reading one or more information units from a memory unit at a location specified by the system address bus, the reading means comprising read request receiving and buffer means having a plurality of storage locations for storing received read requests and associated read addresses prior to the execution of the read requests. The memory control unit further comprises means, having a first input coupled to the write buffer means and a second input coupled to the read request receiving means, for comparing a received read address to write addresses stored in the write address buffer means, the comparing means having an output for indicating, when asserted, the occurence of the reception of a read address having a value within a predetermined range of values of one of the stored write addresses.

In accordance with a method of the invention there is disclosed a method of reading and writing the information units which comprises the steps of buffering write requests, including write addresses, as they are received from a system bus; buffering read requests, including read addresses, as they are received from the system bus; and comparing when received each read address against buffered write addresses, if any, to determine if a received read address has a value within a predetermined range of values of a buffered write address. If a received address is not determined to be within the predetermined range of addresses of any buffered write addresses the method further comprises the steps of executing all buffered read requests; and executing all buffered write requests. If a received address is determined to be within the predetermined range of addresses of any buffered write addresses the method further comprises the steps of executing all buffered read requests up to but not including the received read request which was determined to be within the predetermined range of addresses; executing all buffered write requests; and executing the buffered read request which was determined to be within the predetermined range of addresses.

BRIEF DESCRIPTION OF THE DRAWINGS

The foregoing aspects of the invention will be made more apparent in the following detailed description of a preferred embodiment read in conjunction with the accompanying drawing wherein:

FIGS. 4a–4e illustrates the format of various system IPC commands;

FIG. 5a is a block diagram which conceptually illustrates the MCU 22;

DETAILED DESCRIPTION OF A PREFERRED EMBODIMENT

Figure 1:
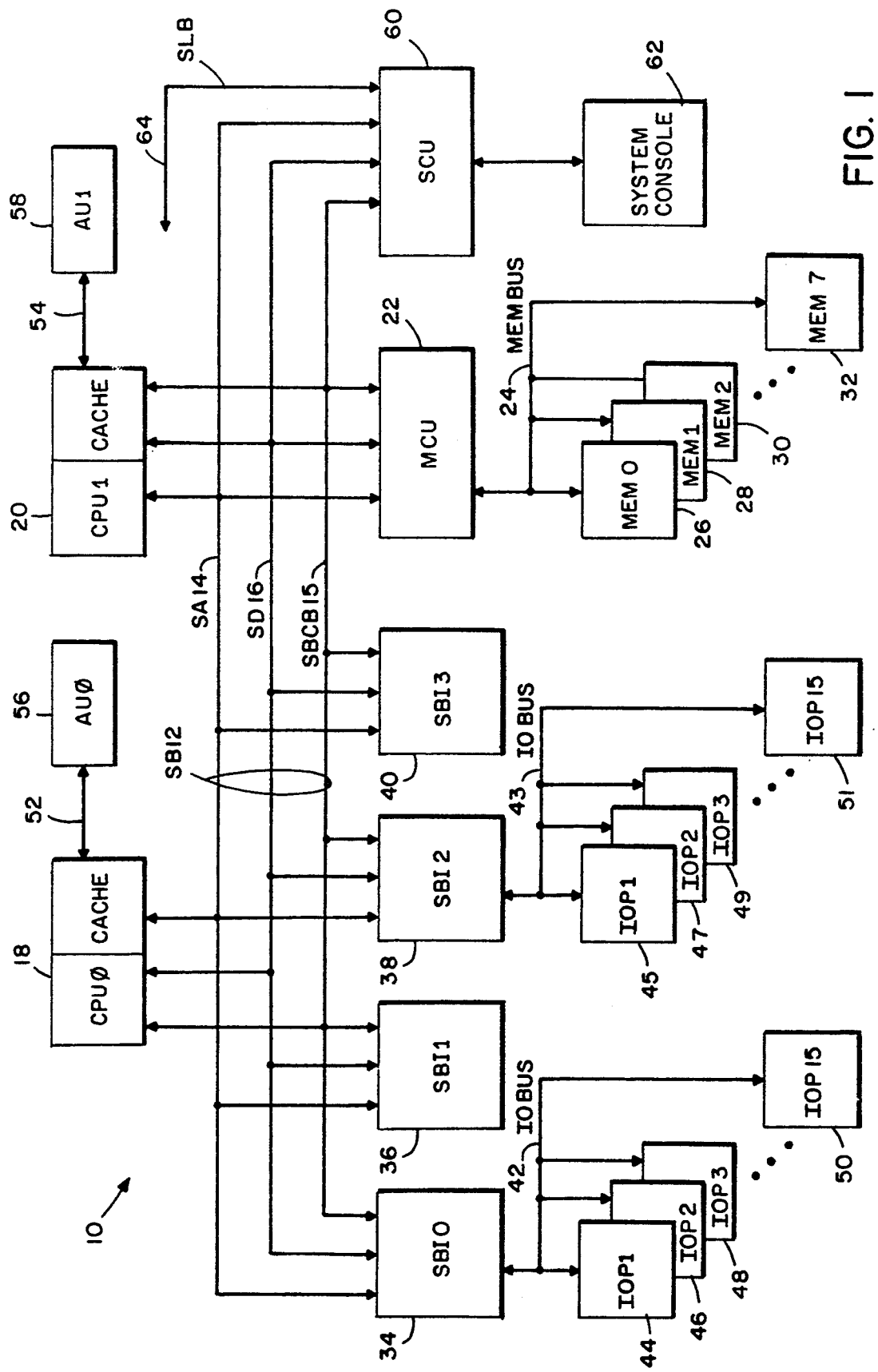
FIG. 1 is a block diagram of an information processing system having an embodiment of the invention.

Referring to FIG. 1 there is shown an information processing system (SYSTEM) 10 incorporating a preferred embodiment of the invention. As seen, SYSTEM 10 comprises a System Bus (SB) 12 which further comprises a System Address Bus (SA) 14, a System Bus Control Bus (SBCB 15) and a System Data (SD) bus 16. SB 12 functions to convey information units between the various components of the SYSTEM 10. Information units may be addresses, I/O input or output data, operands, instructions or any other type of information which passes between the components of the SYSTEM 10. In the preferred embodiment of the invention SB 12 is a high speed, non-interlocked bus which operates at ECL voltage levels. That is, logic signals on the bus swing between approximately −0.9 volts and −1.8 volts.

Coupled to System Bus 12 are a plurality of system units, or bus connections, which include a first central processing unit (CPU0) 18 and an optional second CPU1 20. Also coupled to SB 12 is a memory control unit (MCU) 22 which has coupled thereto via a memory bus 24 one or more memory boards, such as MEM0 26, MEM1 28 and MEM2 30. In the preferred embodiment of the invention MCU 22 may be coupled to up to eight memory boards, such as the MEM7 32. Each memory board may store from, for example, four million bytes (4 MB) to 128 MB of information depending upon the type and quantity of memory devices installed. SB 12 also has coupled thereto one or more system bus interface (SBI) units, such as the SBI0–SBI3, 34, 36, 38 and 40, respectively. Each of the SBIs is further coupled to an associated I/O data bus (IODB), such as the IODBs 42 and 43 coupled to SBI0 34 and SBI2 38, respectively. Each IODB in turn has coupled thereto up to fifteen intelligent I/O processors (IOPs), such as the IOPs 44–50 and IOPs 45–51. In the preferred embodiment of the invention the IODBs 42 and 43 operate at TTL levels. That is, logic signals on these buses swing between approximately zero volts and +5.0 volts. CPU0 18 and CPU1 20 each comprise an associated high speed cache memory and are each further coupled via a cache data bus (CDB) 52 and 54, respectively, to an arithmetic unit (AU0) 56 and AU1 58, respectively. Also coupled to SB 12 is a support control unit (SCU) 60 having a system console (SC) 62 coupled thereto. A support link bus (SLB) 64 provides access and communications from the SC 62, via SCU 60, to the various units coupled to the SB 12. Diagnostic and other information, such as system initialization data, is generally provided over SLB 64.

In general, the CPUs 18 or 20 generate virtual memory addresses which are translated into physical addresses and issued over SA bus 14. Addresses are received and interpreted by MCU 22 for addressing, via the memory bus 24, instructions and data which are stored in the memory boards 26–32. Data and instructions are read and written over the SD bus 16 in accordance with the information conveyed by SBCB 15.

Furthermore, SBIs 34–40 are also operable for transferring memory addresses and data over the system bus 12 for storing and retrieving data from the memory boards 26–32. It should be realized that one or more of the IOPs 44–51 may be coupled to a mass storage device such as a magnetic disk. Also, some of the IOPs may be coupled to data communications means operable for inputting and outputting data from the system 10. The IOPs may also be coupled to operator workstations where an operator enters data into the system.

In order to facilitate the description of the invention the operation of the SB 12 will now be described in further detail.

SB 12 is a synchronous, non-interlocked bus having a 64 bit data path and a 28 bit address path. SB 12 provides a peak interconnect bandwidth of 200 Mb/sec. and is, as previously mentioned, comprised of emitter coupled logic (ECL) drivers and receivers.

The following signals describe the System Bus 12 operation and protocol.

System Data (SDATA(0:63)

System Data Bus 16. All memory data traffic to and from bus connections is transferred via these 64 lines. In accordance with the invention when the CMD Flag, to be described, is asserted then certain of these lines are used to transmit Command-ID information, as described below in relation to CMD and ID.

Data Parity (SDPAR(0:7))

Odd Data Parity. One parity bit for each data byte, eight total, of SDATA 16.

System Address (SA(04:31))

System Address Bus. A bus connection transmits during a memory read or write cycle a memory address to the MCU 22 via these 28 lines. The MCU 22 thereafter drives these lines with the address of data read one bus cycle before the data is driven on the bus. Writeback caches coupled to the SB 12 use the MCU 22 driven address to make directory comparisons to determine if bus intervention is required and also drive the address lines during a cache re-transmission. Also, the system address lines, during an IPC transaction (to be described), convey the IPC message and other IPC related data.

Address Parity (SAPAR)

Odd Address Parity bit.

Command Flag (CMDF)

This line, when asserted by a bus connection, indicates that the SDATA Bus 16 is being used by the bus connection to transmit Command-ID information. When this line is not asserted and the bus is valid as indicated by BUSVLD, described below, CMDF indicates that SDATA 16 is transmitting data.

Command (CMD)

During a bus cycle when CMDF is asserted a bus connection places the type of command on SDATA [48:55]to initiate a memory operation or, in the case of the MCU 22, to return data to a requesting bus connection. The eight bit CMD field encodes the type of bus operation.

In the preferred embodiment of the invention the various types of bus operations encoded by the CMD field are as follows.

OPERATION

No Operation
Read Double Word
Read Quad Word
Read Octal Word

Write Byte
Write Word
Write Double Word
Data Return (transmission from MCU)
Transmit IPC
Read MCU
Write MCU Other signals which comprise the SB 12 are as follows.

ID Each bus connection has a unique identifier (ID). During a bus cycle when a bus connection asserts CMDF the bus connection drives its unique ID onto SDATA [56:63]along with the bus command (CMD) on SDATA [48:55]. The MCU 22 drives the previously received and buffered ID of a bus connection which made a memory request when the data is returned to the requesting bus connection. During the assertion of a Transmit IPC command on SDATA[48:55]a bus connection drives the ID of the target of the IPC command on SDATA[56:63].

Busy (BSY)

This signal line is asserted by a bus connection during all cycles of a bus operation except the last cycle. BSY is sampled at the end of each bus cycle by all connections wishing to use the bus and indicates, when asserted, that the bus is in use and is unavailable to other bus connections. During a START IO IPC command directed to an IOP through an associated SBI the SBI continues to drive the BUSY line until communication is established with the target IOP and a determination is made as to whether the IOP has accepted the START IO command.

Bus Valid (BUSVLD)

This signal is asserted by a bus connection when valid information is placed on the bus.

Lock (LOCK)

Asserted by a bus connection when it is desired to prevent other bus connections (except the MCU 22) from using the bus. This signal line is utilized to implement semaphore instructions that perform read-modify-write operations.

CPU Hold (CPUHLD)

Two CPUHLD signals are provided, one for each CPU. This signal is generated by a CPU and is sampled at the end of each bus cycle by all other bus connections. This signal indicates that one of the write-back caches may be either retransmitting MCU 22 data or may be updating stored information. CPUHLD has the same effect as BSY; it indicates that the bus is still in use and unavailable to all other bus connections. Like BSY, CPUHLD is deasserted one cycle before the last bus cycle. It is also used by a CPU to interlock fetch/-writeback operations for the cache.

MCU Hold (MCUHLD)

Generated by the MCU and sampled at the end of each bus cycle by all other bus connections. In accordance with one aspect of the invention this signal indicates that the MCU has detected a correctable error and will be retransmitting during the next bus cycle the data in corrected form. The system bus protocol for MCUHLD is similar to that of CPUHLD.

Write Acknowledge (WACK)

Acknowledge generated by the MCU 22 in response to Write operations in the bus cycle following the data cycle and by target devices in response to Interprocessor Communication (IPC) operations.

Target Busy (TB)

This signal is generated by a target device in response to an IPC transmission. TB being asserted indicates that the target is busy and that the transmission was not accepted.

Bus Error (BUSER)

Asserted by any bus connection detecting a bus error.

Mem Exception (MEMX)

Asserted by the MCU 22 during the cycle following address transmission if an Invalid Memory Address is received or during the cycle following data transmission if a double bit, uncorrectable, memory error occurs during a memory read.

Xmit Rq In/Xmit Rq Out (XRQI/XRQO)

This signal is daisy chained between bus connections. A bus connection wishing to use the bus will assert Xmit Rq Out and start transmitting on the next cycle only if the following conditions are met:

Xmit Rq In from its higher neighbor is false;
Busy is False;
Hold is False; and
LOCK is False (Only if not an MCU).

A bus connection passes Xmit Rq In from its higher priority neighbor to Xmit Rq Out which is connected to its lower priority neighbor. In accordance with one aspect of the invention the MCU 22 is assigned to be the highest priority bus connection in the XRQI/XRQO daisy chain. This enables the MCU 22 to gain control of the bus in order to execute queued read and write requests, as will be described in detail below.

Figure 3A:
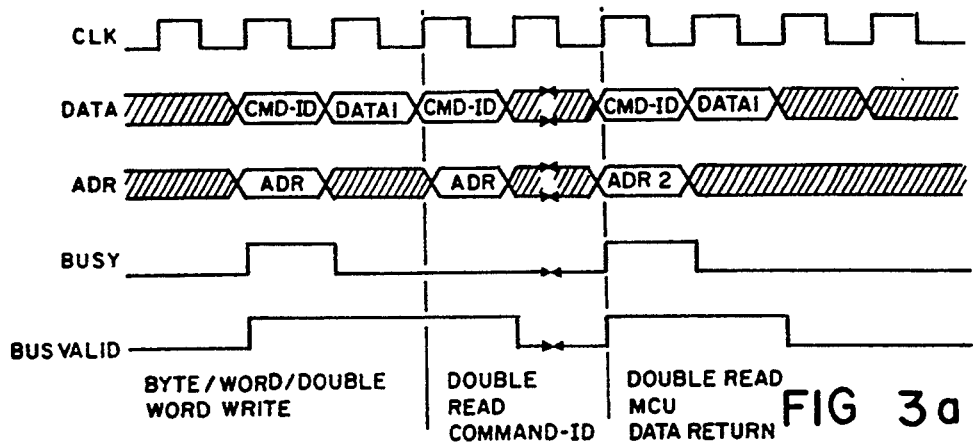
FIGS. 3a, 3b and 3c are timing diagrams which illustrate the operation of the noninterlocked system bus.
Figure 3B:
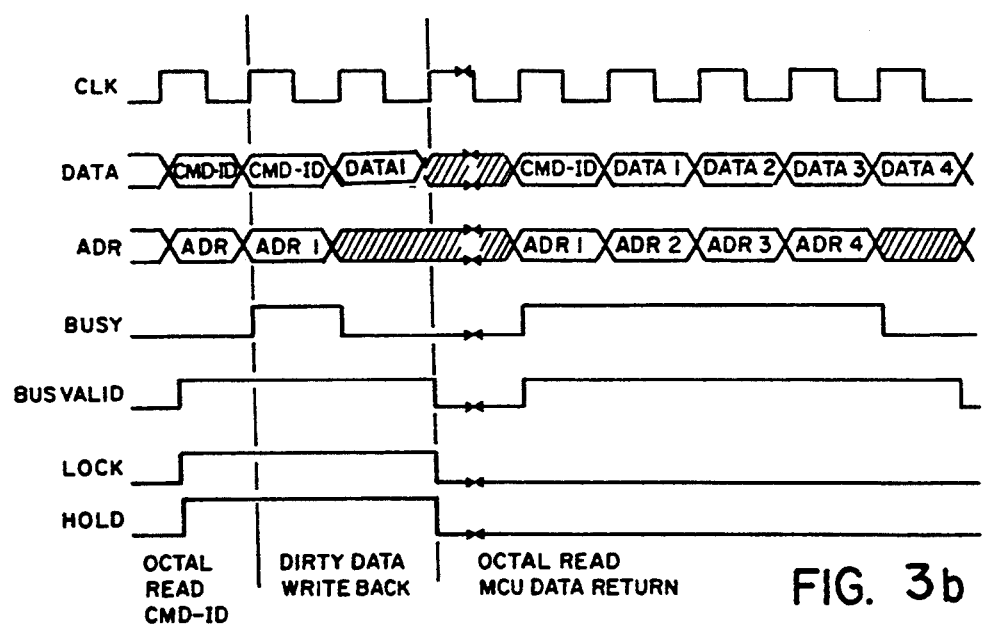
Figure 3C:
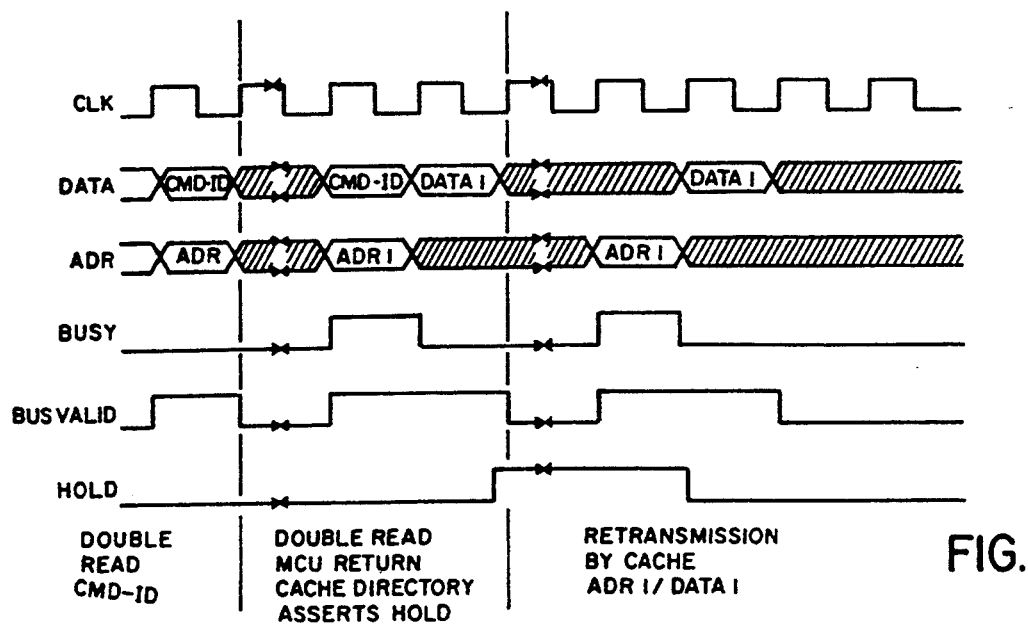

The timing diagrams of FIG. 3 illustrate various types of bus transactions including the operation of the multiplexed Command/ID and data path having an associated address which is presented during a bus cycle which precedes the presentation of data on SDATA 16. In the timing diagrams of FIGS. 3a–3c signal timing is referenced to the period of a system clock (CLK), the clock period representing approximately one bus cycle. In a preferred embodiment of the invention the basic timing unit or time interval, that is the period of CLK, is approximately 40 nanoseconds.

FIG. 3a shows a byte/half/word/double write immediately followed by the Command-ID portion of a double word (64 bit) read followed by an MCU data return of the requested double word.

FIG. 3b demonstrates the use of CPUHLD for a cache fetch/writeback. A CPU is shown sending Command-ID information to the MCU 22 for an octal word read and thereafter a double word cache write-back. The MCU 22 responds with the return of four double words. CPUHLD prevents another bus connection from using the bus during this sequence.

FIG. 3c further demonstrates the use of the CPUHLD line. A bus connection is shown requesting a double word read and the MCU 22 returning the requested double word. The cache or caches latch the address of the double word, and do directory look-ups in the following cycle. If a "dirty" match is found by a cache, that cache asserts CPUHLD shortly before the end of the cycle. The CPUHLD line prevents other connections from using the bus until the write-back cache re-transmits the double word along with its address and thereafter releases CPUHLD. BSY is asserted during the first cycle of retransmission and BUSVLD is asserted for two cycles if retransmission is performed.

An Interprocessor Communication (IPC) facility allows bus connections to directly communicate with one other by sending IPC messages. The bus protocol for sending these messages resembles a Write operation except that the Transmit IPC Command is used instead of a Write command. The address that is transmitted along with the Command ID lines has the format indicated in FIG. 4a. The state of the eight Target field bits specifies a particular target, it being remembered that the ID of the target is conveyed by the ID field of SDATA[56:63].

TARGET

SCU
CPU0
CPU1
SBI0
SBI1
SBI2
SBI3

The 64 bit SDATA bus is used to transmit additional optional message data as required by the various IPC message types. FIGS. 4b, 4c, 4d and 4e illustrate, respectively, an IPC generated by an SBI 34, an IPC generated by a CPU which targets an IOP, an IPC generated by SCU 60 which targets a CPU and an IPC generated by SCU 60 which targets, via an SBI 34, an IOP.

Error Detection

There are four types of error detection mechanisms supported by the SB 12. These four types include:

Data Parity Error Detection: there are eight Data Parity Bits on the 64 bit Data Bus (one parity bit for each byte);

Address Parity Error Detection: there is one Address Parity Bit on the 28 bit Address Bus;

Missing Acknowledge: the Acknowledge control line is used to acknowledge Write and IPC transactions. Read operations are acknowledged by the MCU Data Return Command-ID cycle on the bus; and Sequence Error: illegal bus control sequences are detected by the bus connections involved in a particular bus transaction.

Bus connections detecting any of the above errors assert the Bus Error line for one system bus clock cycle only. This notifies the SCU 60 of the error. The SCU thereafter redrives the Bus Error signal until the SCU 60 clears the error condition. The bus connection also stores the type of error (errors) in an SCU 60 accessible error register.

As has been previously stated, SB 12 is a noninterlocked bus. A significant reduction in bus cycles made possible by the noninterlocked SB 12 results in greater bus bandwidth made available for peak bus request rates and I/O traffic. Inasmuch as MCU 22 internally queues memory accesses a requesting bus connection is not required to incur the memory access time, thereby freeing the SB 12 for other requesters. If the requested access is a write operation the requester is notified as described above and, if the requested access is a read access, the data is later returned.

Figure 2:
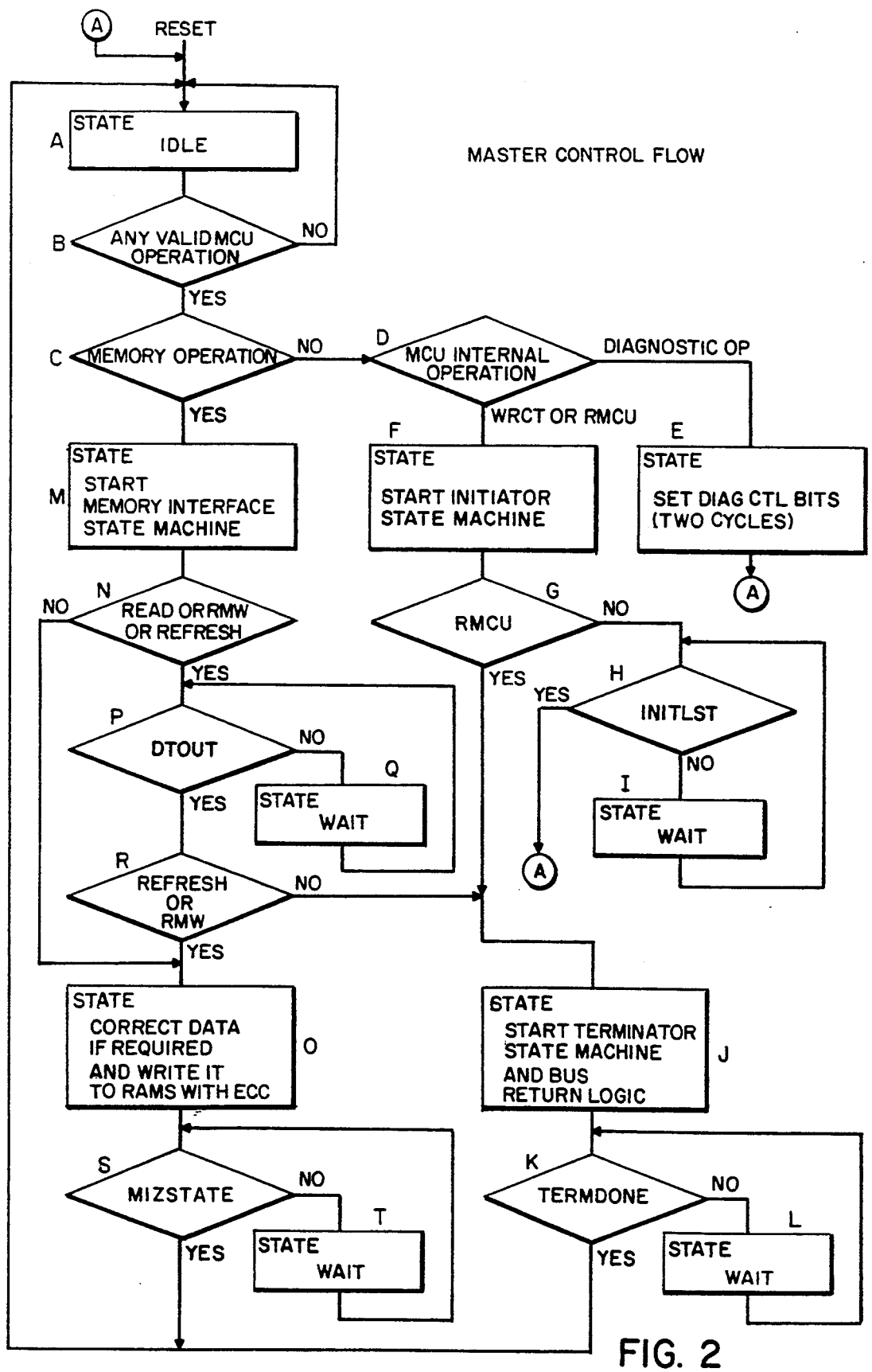
FIG. 2 is a flow chart representation of a master flow of control of MCU 22.
Figures 5B, 7:
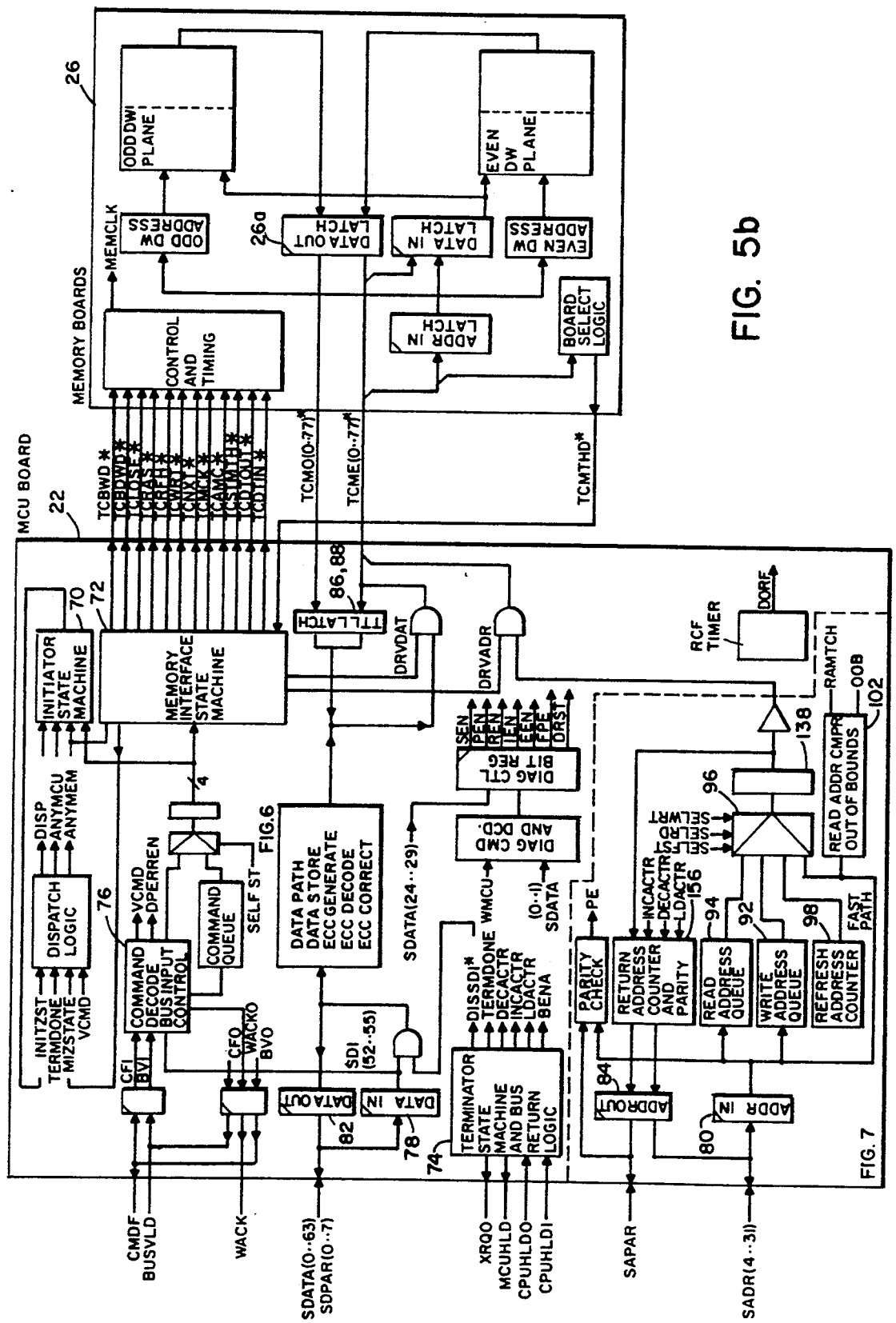
FIG. 5b is a block diagram which shows the implementation of the MCU 22 coupled to a memory array 26.
FIG. 7 is a block diagram showing in more detail other circuitry of the MCU 22.

Referring now to the flow chart of FIG. 2 in conjunction with FIGS. 5a and 5b there is shown in block diagram form the MCU 22 coupled to a memory array 26 via the memory bus 24. MCU 22 is a buffered memory controller capable of performing read operations of up to an octal word length (32 bytes). The memory array 26 is organized as an odd and an even plane, each plane being of a double word width. As the controller of the system memory, the MCU 22 is operable for accepting requests for service from either the CPU0 or CPU1, the SBI 34 and the SCU 60. As has been previously stated, the MCU 22 may be coupled to up to eight memory arrays.

In general, the MCU 22 logically connects the System Data 16 and Address 14 buses to the memory arrays. In accordance with one aspect of the invention two data paths are provided for memory read operations. A first path is a fast data path which is used when no MCU 22 pending requests are stacked upon an internal queue. The fast path drives uncorrected data directly onto SB 12, the data simultaneously being provided to error detection and correction (ECC) circuitry. If a correctable error is discovered the MCU signals the receiving bus connection and thereafter drives the corrected data onto the bus. If the error is uncorrectable, such as a two bit error, the receiving bus connection is so notified. A second data path is a normal path which is employed when the MCU 22 has pending requests stacked upon the queues or does not otherwise have immediate access to SB 12. Inasmuch as MCU 22 must wait for access to SB 12 to return the requested data, the data is provided to the ECC circuitry before being driven out on to SB 12. It can be appreciated that the probability of an error occurring during any given memory read is relatively small, especially in that MCU 22 normally performs error correction during refresh operations, and that the use of the fast data path provides a significant increase in overall system bus bandwidth.

The MCU 22 comprises a plurality of state machines; including an Initiator State Machine (ISM) 70, a Memory Interface State Machine (MISM) 72 and a Terminator State Machine (TSM) 74. A System Bus Decode (SB DECODE) 76 logic block decodes SB 12 signals and provides outputs which are provided to the ISM 70 and MISM 72. In general, the ISM 70 provides signals which initiate the operation of MCU 22 in response to a read or write request. MISM 72 generates a plurality of output signals, shown generally as the signal MEMORY CONTROL, which is provided to the memory arrays. These signals include memory timing strobes and refresh related signals. The TSM 74 decodes certain of the SB 12 signals and provides other signals to the SB 12 which are utilized when the MCU 22 detects a data error during a data return. The TSM 74 also controls the sequencing of data and address latches used when data and command/ID information units are returned to the SB 12.

In this regard there is provided an input data latch 78, an input address latch 80, and a corresponding pair of output data and address latches 82 and 84, respectively. Between the MCU 22 and the memory arrays there are provided an odd memory plane data latch 86 and an even memory plane data latch 88. Memory addresses are multiplexed onto the even plane signal lines.

Write data from SB 12 is buffered in an octal double word latch, or queue, 90 and associated write addresses are buffered in an octal latch, or queue, 92. Thus, up to eight pending write requests may be buffered by the MCU 26. A quad read address latch, or queue, 94 buffers up four pending read requests. A four input multiplexer 96 selects the source of the address for a particular memory access from either the write address queue 92 or the read address queue 94. Another multiplexer 96 input is provided directly from the input address latch 80 and is employed for a fast memory access path when it is desired to bypass the queues. A refresh address counter 98 provides refresh addresses through multiplexer 96 during memory array refresh cycles. A buffer 100 buffers the selected output of multiplexer 96 onto the even plane signal lines.

In accordance with the invention an address comparison logic block 102 compares an address associated with an incoming read request to write addresses, if any, buffered in queue 92. If a match occurs a signal Read Address Match (RAMTCH) is asserted. RAMTCH being asserted causes normal processing of read and write requests to be suspended and buffered read and write requests to be executed. This aspect of the invention will be described in greater detail below.

MCU 22 also comprises error correction and detection logic 104 which is interposed between the odd and even memory data latches 86 and 88, respectively, and the write queue 90 and the output data latch 82.

In FIG. 2 there is illustrated the flow of control of MCU 22 in response to an MCU operation initiated by a bus connection or by an internally generated refresh request. After exiting an initial reset condition MCU 22 enters an idle state (A) which includes testing for the occurrence of a valid MCU 22 operation (B). If a valid MCU 22 operation is detected a further test is made (C) to determine if the operation is a memory operation, that is an operation which will access one of the memory arrays, or whether the operation is an internal operation. If the latter condition is true a further test (D) is made to determine if the internal operation is a diagnostic operation or an operation that reads or writes data to an internal MCU 22 resource, such as a read or a write to a reference and change table (RCT). If a diagnostic operation is indicated diagnostic control bits are set (E) and the idle state A is entered. If an access to an internal MCU 22 resource is indicated the Initiator State Machine 70 is started (F). A test is performed (G) to determine if the internal operation in progress is an RMCU operation, which requires that a data return be made to SB 12, or is a non-return type of operation, such as a write to the RCT. If the latter is true a test is made (H) to determine if the ISM 70 is idle and a wait state (I) is entered until ISM 70 is finished, at which time the Idle State A is reentered.

If a data return is required the Terminator State Machine 74 is started (J) and a test is made (K), with a wait state (L), until the data return is complete. At the completion of the operation of the TSM 74 the Idle State A is reentered.

At step C, if a memory operation is indicated, the Memory Interface State Machine 72 is started (M) and a test is performed (N) to determine if a read operation, read-modify-write operation, or if a refresh cycle is in progress. If none of these are true it is assumed that a write operation is in progress. Control branches during a write operation to a state (O) where the data is corrected, if required, and the data is written to the memory array. If test N determines that a read, RMW or refresh operation is in progress a test is made (P), with an attendant wait state (Q), for the assertion of a Memory Interface State Machine 72 signal DTOUT. The assertion of DTOUT indicates that a memory array is being requested to provide the data which is currently being indicated by the address being sourced on the even plane data/address signal lines. When the data is returned to MCU 22 a test is made (R) to determine if the data is to be driven onto SB 12 or is to be written back to the memory array (a refresh or RMW access). If the data is to be driven onto SB 12 the flow of control transfers to J where the TSM 74 is started. If the data is to be written to the memory array the flow of control transfers to block 0 where the data is corrected and written. Thereafter a test is made (S) with an attendant wait state (T) to determine if the Memory Interface State Machine 72 is idle, indicating the completion of the write cycle. Flow of control then passes back to the Idle State A.

Figure 6:
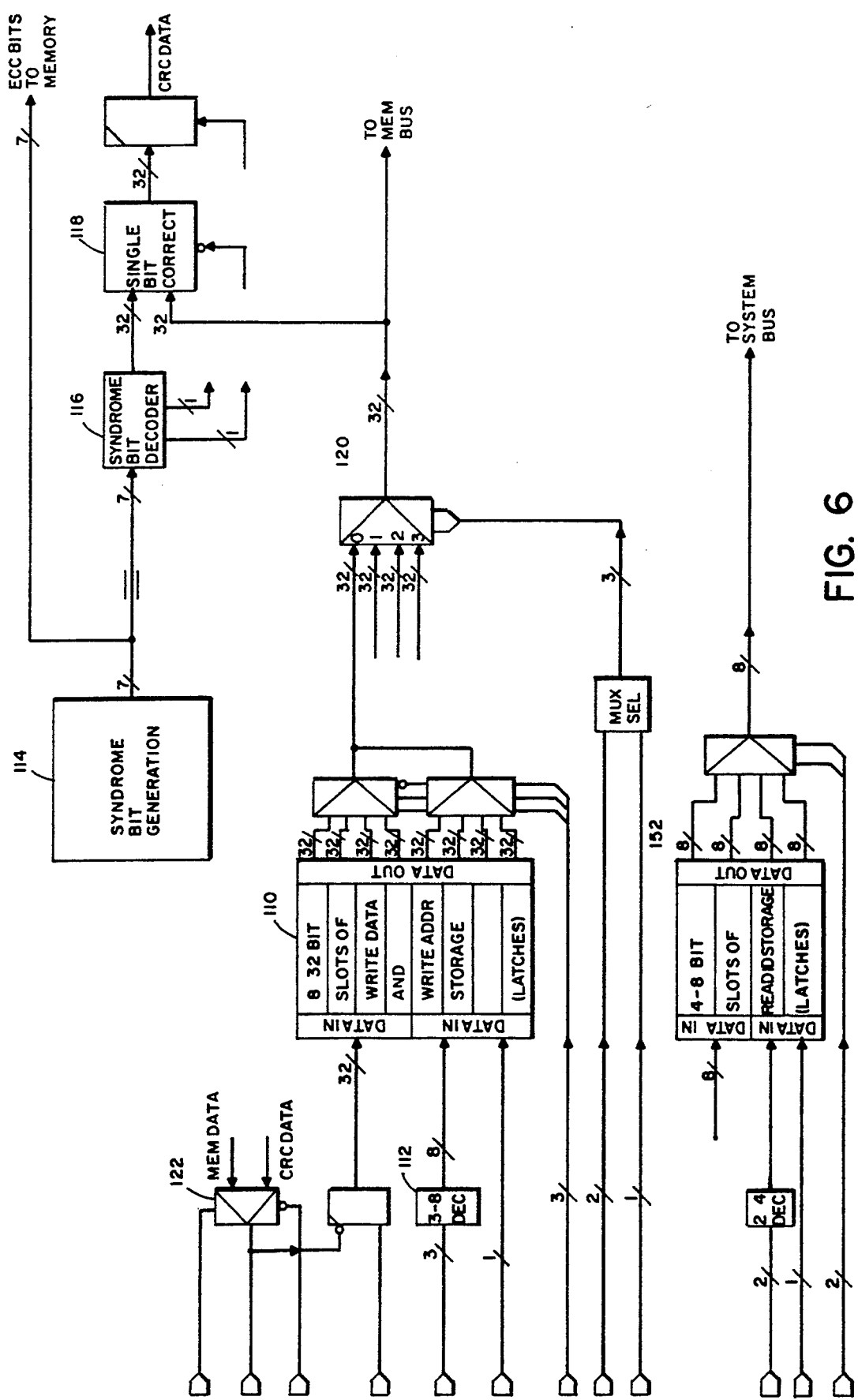
FIG. 6 is a block diagram which illustrates in more detail a portion of the circuitry of the MCU 22.
Figure 7:
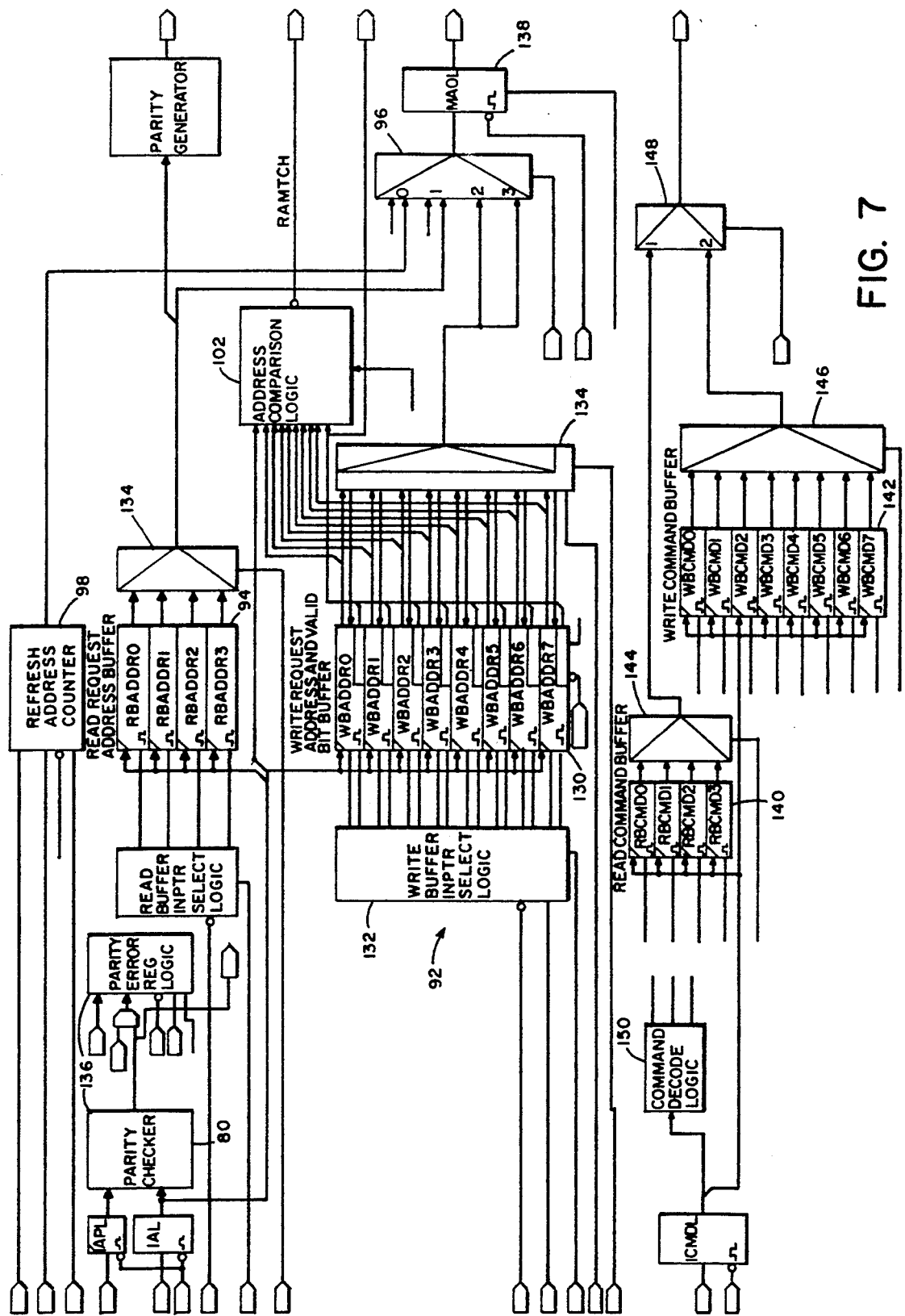

Referring now to FIG. 6 there is shown in more detail a portion of the MCU 22 circuitry. The circuitry shown in FIG. 6 is, in a preferred embodiment of the invention, embodied in one of a pair of identical gate array devices which are utilized to buffer write data and addresses, buffer read ID data and perform ECC functions. Each write data latch 110 storage location is one word, or 32 bits, in width. A 3-8 decoder 112 provides eight selection outputs for selecting one of the eight latches for storing write data.

ECC circuitry comprises syndrome and write check bit generation logic 114, a syndrome bit decoder 116 and single bit correction circuitry 118. A four input, 32 bit multiplexer 120 selects a source of data for application to the output memory data lines. Input memory data (MEMDAT) is applied to a 2 input multiplexer 122 which permits either the uncorrected memory data or corrected CRCDAT to be output to the system bus latches. During the aforedescribed fast read cycle MEMDAT is output. If an error is detected corrected CRCDAT is subsequently provided.

A four location 8 bit read ID latch 124 is provided for latching a SB 12 bus connection ID during a read access. This latched ID is later driven onto SB 12 during the return of the requested read data in order to identify the target of the data.

Referring now to FIG. 7 there is shown circuitry adapted for buffering read and write request addresses and commands. In a preferred embodiment of the invention the circuitry of FIG. 7 is also embodied in a gate array device.

A Write Request Address and Valid Bit Buffer 130 stores 28 address bits at locations determined by Write Buffer Input Pointer Selection Logic 132. A valid bit associated with each of the write buffer locations is set when an address is stored and is reset when the corresponding write operation is accomplished. One of the write addresses is selected by 8 input multiplexer 134 which supplies the write address to the memory address multiplexer 96. Other inputs to the memory address multiplexer 96 include the refresh address from the refresh address counter 98 and a read address from a four input read address multiplexer 134. Address parity logic 136 detects parity errors which may occur on the input read and write addresses. The output of memory address multiplexer 96 is latched by a memory address output latch 138.

A quad, two bit read command buffer 140 and an octal, two bit write command buffer 142 have outputs which are individually selected by multiplexers 144 and 146, respectively. The outputs of multiplexers 144 and 146 are applied to a read/write command multiplexer 148.

Figure 9:
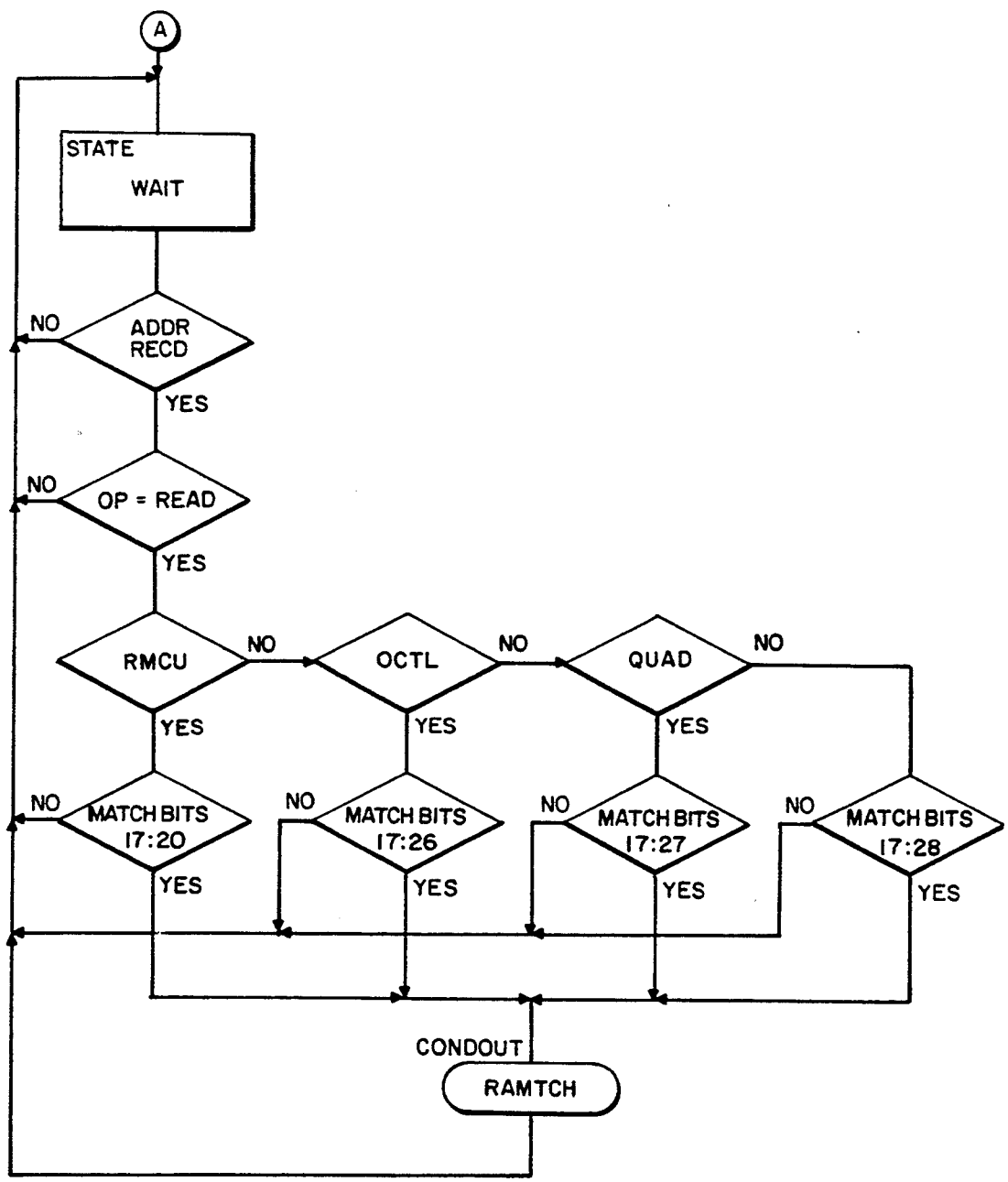
FIG. 9 is a flow chart which illustrates the operation of a portion of the associative address comparison as a function of read type.

A Command Decode Logic 150 block decodes CMD bits 0, 2 and 3 to determine if an incoming requested read operation is a double word read operation, quad read operation, an octal read operation or a read operation which reads internal data from the MCU 22. These decoded outputs are applied to the Address Comparison Logic 102 block which, as has been described, performs an associative address comparison of all of the buffered write addresses against an incoming read request address. If a match is detected the RAMTCH signal is asserted which initiates special processing of the read and write buffers. As shown in the flow chart of FIG. 9, depending upon the type of read operation different numbers of bits are compared between the incoming read address and the queued write addresses. For example, during an octal read 10 address bits (17:26) are compared, during a quad read 11 bits (17:27) are compared while a double word read compares 12 address bits (17:28). During an internal read, typically of the RCM, only four bits are compared; these bits corresponding to a memory address page frame associated with the reference and change table.

Due to the noninterlocked operation of the SB 12 the MCU 22 buffers incoming read and write requests, normally allowing incoming reads to proceed ahead of buffered writes. The MCU 22 comprises the address comparison logic 102 to properly sequence the execution of requests in the event that an incoming read address matches, within a predetermined range of memory addresses, a buffered write address. In this case, the queued read and write requests are executed before the read request which caused the match proceeds. The logic employed to perform the match function implements an associative address comparison of all buffered write addresses versus an incoming address associated with a read operation. The least significant twelve bits of the incoming read address are compared down to the double word level, depending on the type of requested operation, that is, on the decoded output of command decode logic 150.

All read requests performed by the MCU 22 are of a double word width or more. The MCU 22 may also perform quad word reads and octal word reads efficiently as the MCU 22 comprises a quad word width incoming data path from the memory boards. During an octal read, the MCU 22 receives two quad words from a memory array, separated in time by three memory clock cycles. This allows the return of data to the requester with a minimum number of wait states once the first double word of data is driven onto the SB 12. Write requests to the MCU 22 may be of byte, word, or double word width. Write requests of less than a word width (byte writes) force a read-modify-write cycle to be executed by the MCU 22.

SB 12 permits a bus connection to send the MCU 22 multiple back-to-back memory write requests. Bus re-arbitration is not necessary during each double word transfer as the SB 12 can be held by the bus connection using the aforedescribed LOCK signal line. This SB 12 LOCK condition may be maintained for up to an octal word write (four time-contiguous write operations). Re-arbitration must be performed, however, after at most every octal word write as the MCU 22 must be capable of requesting and receiving ownership of the system bus after each write transfer.

The MCU 22 has the capability to stop a bus connection after any write request and hold the bus in a quasi-busy state should the Write Buffer fill after a given write request. The same quasi-busy state may be established by the MCU 22 when the Read Buffer fills. This allows the MCU 22 to hold off further bus requests until it can at least partially empty the full buffer. As has been previously stated, the XRQO signal line of SB 12 is used for this purpose. The MCU 22 is defined to be the highest priority device on SB 12 and its XRQO line will force other requesters to hold their bus operations until the MCU de-asserts the XRQO line.

Figure 8:
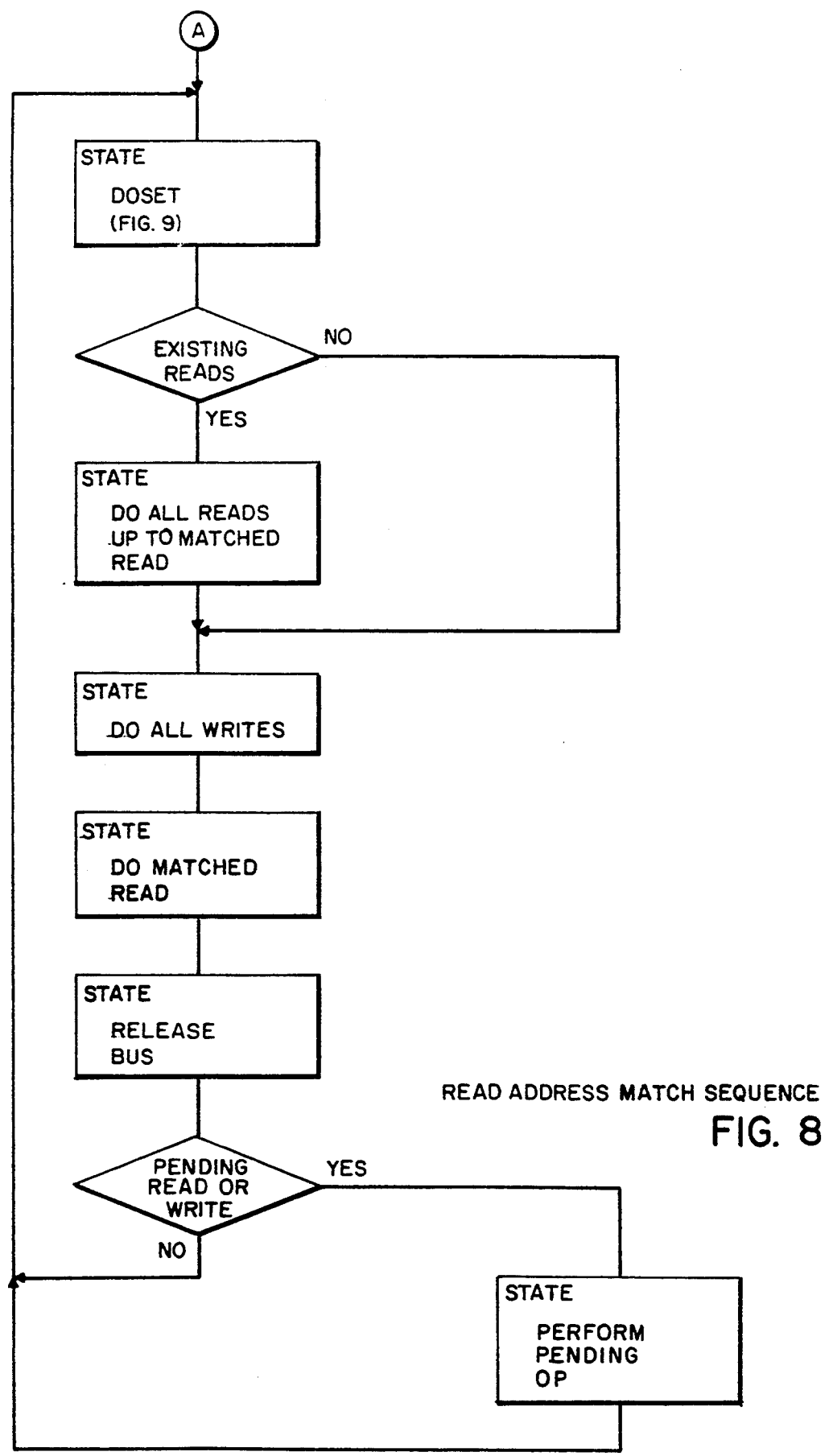
FIG. 8 is a flow chart which illustrates the operation of the read address match circuitry.

As has been stated, the Write Address is stored within the latch 130 which is used during the associative address compare. This latched storage permits all eight possible queued Write Addresses to be accessible during the associative address compare. The address compare is performed when a Read operation is decoded from the CMD (0:3) lines which are been latched from the System Bus 12. As has also been stated, the associative compare generates a bit, called the RAMTCH (Read Address Match) bit. This bit being asserted serves as a flag which indicates that special sequencing is required by the MCU 22. The RAMTCH bit being asserted causes the bus interface controller to assert XRQO to lock SB 12 to prevent the entry of a further Write request into the Write Buffer. Thus, no further Write requests are accepted from the System Bus 12 until the MCU 22 has cleared the RAMTCH flag by performing a RAMTCH operation sequence. The RAMTCH operation sequence is illustrated in the flow chart of FIGS. 8 and 9.

The assertion of the RAMTCH flag indicates that a requested read operation will read a location which has a write request pending as well. The write request should preferably proceed ahead of this read request otherwise old data may be returned to the requester and data integrity may not be preserved. In accordance with one aspect of the invention the requests queued in Read Buffers 94 and 140 are executed to the point where the Read request which caused the assertion of the RAMTCH bit is encountered. Before this Read operation can proceed, the requests queued in Write Buffers 90 and 92 are executed, including the queued Write request which triggered the assertion of RAMTCH. The Read operation is then accomplished and the data returned to the requester reflects the result of the just executed Write operation. SB 12 is then released so further system bus activity may occur.

It should be noted that the assertion of the RAMTCH signal indicates that the Write Buffer contains at least one, and possibly more, write operations that must complete before the read request which caused the assertion of RAMTCH can start. As has been stated, the state of the Write buffer contents must be frozen at this point. This is due to the fact that all pending Write requests are executed before the execution of the Read request which caused the match. If another write operation were allowed to enter the Write Buffer, this operation may have as a target the same location that the matched Read operation desires. If the data from this later Write operation is allowed to enter the system memory during the flush of the Write Buffer, the Read operation may read data which is too "new" for it. Thus, further writes must be halted until the read which set the RAMTCH completes. The following illustrate memory request sequence illustrates the foregoing description of the operation of MCU 22.

SEQUENCE OF REQUESTS TO MCU

Read A
Read B
Write X
Read X
Write Y
Write X

If it is assumed at the start of the foregoing sequence that no requests are pending in the Write Buffer and the Read Buffer then Read A and Read B will proceed normally, that is, the RAMTCH bit will not be asserted. Write X is placed into the Write Buffer to be written to the system memory when the Read Buffer is empty.

Read X then enters the MCU 22 and forces the assertion of the RAMTCH bit due to the associative address compare of the incoming Read X address with the address of Write X. The assertion of RAMTCH also causes the MCU 22 to lock the System Bus 12 to prevent the entry of further Write requests. Meanwhile, Write Y has entered the System Bus Latch on the MCU 22. Write Y is the last operation that can enter the MCU 22 until the MCU 22 releases the bus. However, the Write Y request is not processed until the read requests within the Read Buffer are executed. The Write Y request is placed into the Write Buffers and is specially marked, as will be described, so that it will not commence until the previous Read X operation has completed.

Inasmuch as no further requests can now be received from SB 12 the MCU 22 completes the Read B operation and then executes the pending requests in the Write Buffer, due to the RAMTCH bit being asserted for the Read X operation. The MCU 22 thereafter completes the Read X operation. At the completion of this operation, the system Bus 12 is released by the MCU 22 so that the Write Y operation can commence and the Write X operation can enter the MCU 22 and execute in its turn.

Were the SB 12 not halted at the Write Y operation, the second Write X operation could enter the Write Buffer before the execution of the Read X. After Write Buffer request execution, the data from the second Write X operation would be read by the Read X operation and erroneous data may be returned to the requester.

A Read request entering the MCU 22 which finds no queued Read requests is directed immediately to the memory arrays for execution. This allows a minimum latency for a read request from the requester's viewpoint. Write requests entering the MCU 22 are immediately buffered unless the MCU 22 is in the Idle State (FIG. 2), whereupon the execution of the Write request is immediately begun. The buffering of Write requests allows Write requests to enter the MCU 22 while a Read operation is in progress. Read and Write requests may thus enter the MCU 22 while other operations are in execution so long as the RAMTCH flag is not asserted. The operation of MCU 22 thus proceeds, allowing reads to execute and writes to be buffered while the reads are executing. At a point in time where all Read requests have been executed and no further Read requests are incoming from the System Bus 12, the execution of queued Write requests, if any, begins. If there are no queued Read or Write requests and no incoming operation from SB 12, the MCU 22 is considered to be in the Idle State.

During read operations, if a predetermined number of Write requests become queued ownership of SB 12 is requested by the MCU 22. All buffered Read requests are then executed and at least one Write request is executed before the MCU 22 again releases SB 12. The same sequence is followed if a predetermined number of Read requests accumulate. This prevents loss of memory operations due to buffer overflow. As the MCU 22 is the highest priority device on the System Bus 12 during normal operation (it is first on the XRQO/XRQI daisy chain), it can effectively become the SB 12 master at any time. However, inasmuch as the SB 12 is essentially pipelined, one further memory operation may enter the MCU 22 System Bus Latch before the MCU 22 gains bus control. This further memory operation, as was previously mentioned, is marked until such time as the MCU 22 can again allow a normal flow of requests to proceed.

The predetermined number of pending Write requests is preferably set at four double words due to the operation of the write-back cache memory associated with CPU0 18 and CPU1 20. That is, the MCU 22 must be ready to accept at anytime a cache write-back of four double words. Thus, by maintaining a maximum number of pending Write requests of four a cache write-back may be accommodated at anytime.

During memory refresh, all memory array boards are refreshed simultaneously. In addition, data "sniffing" and "scrub" cycles are performed at this time, with one double word being read back from one bank of the dynamic RAM memory. Thus, the refresh cycle is similar to an extended double word read. If an error is detected, the error is corrected and the corrected data is returned to the memory arrays. During a normal double word read, only one division of a memory array (upper or lower) receives the RAS and CAS strobes while the other division remains in a standby mode (no RAS, no CAS). During refresh, both divisions receive RAS simultaneously. During the aforementioned storage of a corrected double word the memory array division receiving the corrected data will further have its associated CAS strobe asserted.

A refresh cycle normally requires six memory clock cycles to complete, assuming that no error is detected. If an error is detected and is correctable, the refresh cycle requires an additional write double word access time of five cycles.

The sniff logic corrects and writes back any single bit errors. This has the effect of periodically scrubbing the memory clean of single bit errors. Each time a refresh operation is performed, a double word of data is read and, if necessary, corrected and written back to the location from which it came. Refresh addressing logic contains up to 10 bits for the RAS portion of the address and 15 address bits to be divided between the CAS portion of the address, decoding logic to determine a memory board to be selected for a read, and bank decode logic to select the bank and division (upper/lower) to be read.

The MCU 22 has a number of paths through which address information can flow. The normal path is for the address to enter through the Input Address Latch 80 and then into the Write/Read Queues 92 and 94. Once placed into the Write/Read Address Queues 92, 94, the address remains there until that particular write operation is called up for execution. In the case of an idle MCU, the address effectively bypasses the queues and is immediately applied, or set up, to the memory, therefore expediting read and write operations.

Data that is to be written to the main memory is passed through the 4 to 1 multiplexer 120. The output of multiplexer 120 is provided to several destinations. One of these destinations is directly to the memory arrays. Another destination is the ECC encode/decode logic where the check bits are generated and sent directly to memory with the data on a memory write operation. The data and check bit signal lines are bi-directional. This allows data and check bit output during a write operation. During a memory read, the direction is reversed.

A more complex data path exists for read-modify-write operations. Such operations require that a double word of data be read from a memory unit and that the data be checked for errors. If an error occurs the error is corrected and the corrected data is merged with a byte of data which has been stored in the Write Buffer 110. This is accomplished using the multiplexer 120 and selecting, on a byte basis, the source for the multiplexer to be either the latched and corrected read data or the Write Buffer output. The merged data is thereafter re-encoded and sent to the memory by the same path as a normal write operation.

The ID of a bus connection to which data is to be returned is buffered in Read ID storage latches 152 and is multiplexed onto the SB 12 data path during the MCU 22 data return cycle. During a read operation, while the MCU 22 awaits the return of data from a memory array, MCU 22 sets up the return ID and address for the SB 12 Data Return cycle. One cycle before the data is sent over SB 12, the requester's ID, a Data Return Command, and the address originally provided by the requester are returned to the requester. If any delay is incurred in obtaining ownership of the system bus, the Data Return cycle is delayed. Resource conflicts are avoided by use of the latches 82 and 84, where the return Command, ID and Address are stored until driven onto the bus.

If a correctable error occurs, the data path multiplexer 122 (a 2 to 1 multiplexer) is flipped. One side of this multiplexer 122 receives inputs directly from the memory. The other side receives latched, corrected data from the output of the ECC circuit. Thus, if an error is detected, the corrected data can be sent rapidly by flipping the data output multiplexer 122. At the same time the corrected data is being returned to the requester, the next double word of data (if a multiple double word transaction) is being latched for transmission during the next cycle. If it too is in error it will be sent and then corrected during the following cycle and re-transmitted as was the first double word.

The MCU 22 of the invention also provides correct data when more than one double word of a multi-double word read request is in error. In this case latches back to those on the output of the memory arrays can be used to hold the data until the MCU 22 can process it. A four-stage pipeline is provided to accommodate all possible cases of erroneous data appearing in double words. The four stages comprise latches 26a on the output of the memory arrays (FIG. 5b); latches 82 and 84 at the input of the MCU; and latches 104a and 104b (FIG. 5a) at the input and output, respectively, of the ECC logic 104.

The MCU 22 has both a fast and an internal address path. Whenever the MCU 22 is in the Idle State (not processing any requests with none stored in either the read or write buffers), an incoming operation (either read or write) is begun immediately. The address path is steered toward the fast path. This allows a direct path from the system bus input latches to the drivers on the edge of the MCU 22. If the operation is an MCU internal function (Read or Write MCU), the MCU 22 will begin the operation immediately and will respond (if data is to be sent to the requester) within two cycles after the request enters the MCU. The address will be sent to the memory arrays but the row address strobe (RAS) signal, which initiates all memory operations, is not generated.

The internal path is used if an incoming request must await completion of a previously buffered operation. This path takes the address from the system bus holding latch directly into either the Read Buffer Address latches or the Write Buffer Address latches, 94 and 130, respectively.

An address parity check is performed when addresses enter the MCU 22 as well as an Out of Bounds check. If an error is detected, the BUSERR line is asserted to so indicate. If an address error is detected when a request enters the MCU 22, the MCU will not buffer the operation and will not execute it. It is as if the operation were never sent except that the MCU must notify the SCU 60 of the parity error on the address. In the case of the Out of Bounds check being true, the requested operation has a target location outside the region of available memory, the MCU 22 will assert the MEMX signal line two cycles after the address cycle and will ignore the operation. This condition will be reported to the SCU 60.

When a read operation is performed, the return address is inputted into the latch 84 for return to the requester. The Physical Frame Bits (address bits 04:20) are held in a secondary latch. The page offset bits down through bit 28 (address bits 21:28) are passed through an up/down counter 156 so that the base address may be incremented by the MCU 22 for multi-double word returns. The counter requires up/down capability due to the need to send corrected data after the incorrect data is initially sent (this is during a correctable error sequence). LSB address signals 29:31 are zeroed before being returned from the MCU 22. Parity is generated once on address bits 04:20 and is re-generated over bits 21:28 and is then combined with the upper bit address parity every cycle during a multi-double word data return.

Due to the high speed of SB 12 the MCU 22 decodes the ECC error bits on the fly, as it is sending the data back to the requester. The fast data path actually bypasses the error correction logic and data is returned to the requester, even though it may contain an error. If it does contain an error, the data must be corrected and re-transmitted to the requester during the following cycle. In order to accomplish this function the SB 12 signal line MCUHOLD is provided. MCUHOLD is driven by the MCU to all other bus connections in order to notify the other bus connections of the MCU's intention to retain ownership of SB 12 even though it has released BUSY. MCUHOLD, in turn, is driven, at least in part, by the Single Bit Error Detect logic.

When the check bits are encoded and are sent to memory, the properties of the code which produce them are that exactly three copies of each of 32 data bits go into the formation of seven check bits per each word in a double word. When the check bits return from memory, each one is exclusive ORed with the particular data bits that corresponded to each check bit when generated. Thus, the information contained within these seven bits determines whether there are no bits in error, whether there is a single bit in error, or whether there are multiple bits in error. A single bit error is correctable while multiple bits in error are not. If the seven check bits are all logical zeroes, then there are no bits in error. If there is a single bit in error, then three of the seven check bits will be a logical one. An even number of ones set within the seven check bits indicates that there are at least two bits in error. In the case of a single-bit error, the parity of the check bits alone will be odd. Thus, a simple way to determine quickly that a single-bit error exists by determining the parity of the seven check bits.

The occurrence of a double bit error need not be indicated until one cycle after the data has been returned. To indicate the occurrence of a double bit error the MEMX signal line is pulsed high. The address having an uncorrectable error and the associated syndrome pattern is reported to the SCU 60 via the SLB 64.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. A memory control unit for controlling a main system memory of a data processing system, the main system memory being comprised of at least one memory unit, comprising:

first interface means for coupling said memory control unit to the at least one memory unit of the main system memory;

second interface means for coupling said memory control unit to a system bus having signal lines for expressing information units, including memory read and write requests, the system bus including a system address bus;

means, coupled to said first and to said second interface means and responsive to a write request from said system bus, for executing the write request by storing one or more information units within a memory unit at an address specified by the system address bus, said write request executing means comprising write request receiving and buffer means having a plurality of storage locations capable of storing a plurality of received write requests and associated write addresses prior to execution of the write requests;

means, coupled to said first and to said second interface means and responsive to a read request from said system bus, for executing the read request by reading one or more information units from a memory unit at a location specified by the system address bus, said read request executing means comprising read request receiving and buffer means having a plurality of storage locations capable of storing a plurality of received read requests and associated read addresses prior to execution of the read requests;

said memory control unit further comprising:

means, having a first input coupled to said write buffer means and a second input coupled to said read request receiving means, for comparing a received read address to write addresses stored in said write address buffer means, said comparing means having an output signal for indicating, when asserted, an occurrence of the reception of a read address within a predetermined range of addresses of one of said stored write addresses; and means for controlling the execution of read and write requests, said controlling means being coupled to said comparing means output signal and being responsive to said comparing means output signal not being asserted for causing an execution of all buffered read requests before any buffered write requests, said controlling means further being responsive to said comparing means output signal being asserted for first causing an execution of only those buffered read requests which precede a buffered read request which caused the assertion of said comparing means output signal and then causing an execution of buffered write requests.

2. A memory control unit as defined in claim 1 wherein said controlling means further comprises means coupled to said second interface means and responsive to the assertion of said comparing means output signal for preventing a reception of any further read or write requests from said system bus until the execution of all buffered write requests.

3. A memory control unit as defined in claim 1 and further comprising:

means, coupled to said second interface means and responsive to an execution of a read request, for returning one or more information units to said system bus; and error detection and correction means for detecting and correcting a single bit error in an information unit returned to said system bus, thereby generating a corrected information unit, and including means for subsequently providing the corrected information unit to said returning means.

4. A memory control unit as defined in claim 3 wherein:

said second interface means comprises means for requesting and receiving access to said system bus; and said returning means is responsive to the operation of said second interface means for returning an information unit to said system bus prior to a completion of the operation of said error detection and correction means, said returning means being coupled to said error detection and correction means for receiving a corrected information unit therefrom for returning the corrected information unit to said system bus at a time subsequent to a time when an information unit having a single bit error is returned to said system bus.

5. A memory control unit as defined in claim 4 wherein said returning means comprises means for indicating on said system bus that an information unit being returned has a bit in error.

6. A memory control unit as defined in claim 3 wherein said error detection and correction means further comprises means for detecting multiple bit errors in an information unit returned to said system bus, and wherein said returning means further comprises means for indicating on said system bus that an information unit being returned has more than one bit in error.

7. In an information processing system having a system bus for coupling together a plurality of bus connections, one of the bus connections being a memory control unit coupled to one or more memory units, the memory control unit being responsive to address and data signal lines of the system bus for writing information units to and for reading information units from the memory units, a method of reading and writing the information units comprising the steps of:

buffering write requests, including write addresses, as they are received from the system bus;

buffering read requests, including read addresses, as they are received from the system bus; comparing when received each read address against buffered write addresses, if any, to determine if a received read address has an address value within a predetermined range of address values of a buffered write address;

if a received address is determined not to be within the predetermined range of addresses of any buffered write addresses then:

first executing in sequence all buffered read requests; and then executing in sequence all buffered write requests;

else if a received address is determined to have an address value within the predetermined range of address values of any buffered write address:

first executing in sequence all buffered read requests up to but not including the received read request which was determined to be within the predetermined range;

then executing all buffered write requests; and then executing the buffered read request which was determined to be within the predetermined range.

8. The method of claim 7 wherein the first step of executing when a received read address is determined to be within the predetermined range of addresses includes an initial step of asserting a system bus signal which prevents other bus connections from issuing any further read requests or write requests.

9. The method of claim 7 wherein the steps of executing in sequence all buffered read requests are accomplished by:

applying a read address to the memory units;

retrieving an information unit from a memory unit storage location corresponding to the applied read address;

applying, during a first interval of time, the retrieved information unit to an error detection and correction unit to determine if the retrieved information unit has at least one bit in error, the error detection and correction unit further including means for correcting a single bit error in the retrieved information unit; and driving, during the first interval of time, the retrieved information unit onto the system bus data lines.

10. The method of claim 9 wherein if the error detection and correction unit indicates that the retrieved information unit has a bit in error further comprises the steps of:

asserting a system bus signal for indicating that the retrieved information unit has a bit in error; and driving during a second, later interval of time the corrected information unit onto the system bus data lines.

11. The method of claim 9 wherein if the error detection and correction unit indicates that the retrieved information unit has more than one bit in error further comprises a step of asserting a system bus signal for indicating an error condition.

12. The method of claim 11 wherein if a received read or write address has a value which exceeds a predetermined maximum value further includes a step of asserting the system bus signal that indicates the error condition.

13. A memory control unit for controlling a main system memory of a data processing system, the main system memory being comprised of at least one memory unit, comprising:

first interface means for coupling said memory control unit to the at least one memory unit of the main system memory;

second interface means for coupling said memory control unit to a system bus having signal lines for expressing information units, including memory read and write requests, the system bus including a system address bus;

means, coupled to said first and to said second interface means and responsive to a write request from said system bus, for executing the write request by storing one or more information units within a memory unit at an address specified by the system address bus, said write request executing means comprising write request receiving and buffer means having a plurality of storage locations capable of storing a plurality of received write requests and associated write addresses prior to execution of the write requests;

means, coupled to said first and to said second interface means and responsive to a read request from said system bus, for executing the read request by reading one or more information units from a memory unit at a location specified by the system address bus, said read request executing means comprising read request receiving and buffer means having a plurality of storage locations capable of storing a plurality of received read requests and associated read addresses prior to execution of the read requests;

said memory control unit further comprising:

means, having a first input coupled to said write buffer means and a second input coupled to said read request receiving means, for comparing a received read address to write addresses stored in said write address buffer means, said comparing means having an output signal for indicating, when asserted, an occurrence of the reception of a read address within a predetermined range of addresses of one of said stored write addresses, the comparing means output being coupled to means for controlling an order of execution of stored read requests and stored write requests as a function of whether the comparing means output signal is asserted or is not asserted; and means for decoding said read requests to determine a type of read request, said decoding means having an out coupled to said comparing means for determining a number of bits of said read address which are compared to the buffered write addresses, the number of bits being determined as a function of the type of read request.

14. A memory control unit as defined in claim 13 wherein said decoding means is responsive to read requests for determining if one of said read requests is associated with a first type of request which reads data from a location within said memory control unit, a second type of read request which reads an octal word of data from a memory unit, a third type of read request which reads a quad word from one of a memory unit, or a fourth type of read request which reads at least a double word from a memory unit.

15. A memory control unit as defined in claim 14 wherein said comparing means compares four bits when said decoding means determines that a read request is associated with said first type of read request.

16. A memory control unit as defined in claim 14 wherein said comparing means compares ten bits when said decoding means determines that a read request is associated with said second type of read request.

17. A memory control unit as defined in claim 14 wherein said comparing means compares eleven bits when said decoding means determines that a read request is associated with said third type of read request.

18. A memory control unit as define in claim 14 wherein said comparing means compares twelve bits when said decoding means determines that a read request is associated with said fourth type of read request.

19. A memory control unit for controlling a main system memory of a data processing system, the main system memory being comprised of at least one memory unit, comprising:

first interface means for coupling said memory control unit to the at least one memory unit of the main system memory;

second interface means for coupling said memory control unit to a system bus having signal lines for expressing information units, including memory read and write requests, the system bus including a system address bus;

means, coupled to said first and to said second interface means and responsive to a write request from said system bus, for executing the write request by storing one or more information units within a memory unit at an address specified by the system address bus, said write request executing means comprising write request receiving and buffer means having a plurality of storage locations capable of storing a plurality of received write requests and associated write addresses prior to execution of the write requests;

means, coupled to said first and to said second interface means and responsive to a read request from said system bus, for executing the read request by reading one or more information units from a memory unit at a location specified by the system address bus, said read request executing means comprising read request receiving and buffer means having a plurality of storage locations capable of storing a plurality of received read requests and associated read addresses prior to execution of the read requests;

said memory control unit further comprising:

means, having a first input coupled to said write buffer means and a second input coupled to said read request receiving means, for comparing a received read address to write addresses stored in said write address buffer means, said comparing means having an output signal for indicating, when asserted, an occurrence of the reception of a read address within a predetermined range of addresses of one of said stored write addresses, the comparing means output being coupled to means for controlling an order of execution of stored read requests and stored write requests as a function of whether the comparing means output signal is asserted or is not asserted; and means, having an input coupled to said comparing means output signal and an output coupled to said system bus for asserting a signal on said system bus when said comparing means output signal is asserted, said signal preventing a reception of further read or write requests from said system bus.

20. A memory control unit for controlling a main system memory of a data processing system, the main system memory being comprised of at least one memory unit, comprising:

first interface means for coupling said memory control unit to the at least one memory unit of the main system memory;

second interface means for coupling said memory control unit to a system bus having signal lines for expressing information units, including memory read and write requests, the system bus including a system address bus;

means, coupled to said first and to said second interface means and responsive to a write request from said system bus, for executing the write request by storing one or more information units within a memory unit at an address specified by the system address bus, said write request executing means comprising write request receiving and buffer means having a plurality of storage locations capable of storing a plurality of received write requests and associated write addresses prior to execution of the write requests;

means, coupled to said first and to said second interface means and responsive to a read request from said system bus, for executing the read request by reading one or more information units from a memory unit at a location specified by the system address bus, said read request executing means comprising read request receiving and buffer means having a plurality of storage locations capable of storing a plurality of received read requests and associated read addresses prior to execution of the read requests;

means, having a first input coupled to said write buffer means and a second input coupled to said read request receiving means, for comparing a received read address to write addresses stored in said write address buffer means, said comparing means having an output signal for indicating, when asserted, an occurrence of the reception of a read address within a predetermined range of addresses of one of said stored write addresses, the comparing means output being coupled to means for controlling an order of execution of stored read requests and stored write requests as a function of whether the comparing means output signal is asserted or is not asserted; and said memory control unit further comprising:

means for returning, in response to an execution of a read request, at least one information unit to said system bus;

means, having an input coupled to said read request executing means, for determining during a time that an information unit is returned to said system bus if one or more bits of the information unit read from a memory unit is in error, the determining means further including means for correcting a single bit error in an information unit for providing to said returning means a corrected information unit to be subsequently returned to said system bus; and means, having an input coupled to said determining means and an output coupled to said system bus, for asserting a first signal on said system bus when said determining means determines that an information unit has one bit in error.

21. A memory control unit as defined in claim 20 wherein said asserting means is operable for asserting a second signal on said system bus, said second signal being asserted when said determining means determines that an information unit has more than one bit in error.

22. A memory control unit for controlling a main system memory of a data processing system, the main system memory being comprised of at least one memory unit, comprising:

first interface means for coupling said memory control unit to the at least one memory unit of the main system memory;

second interface means for coupling said memory control unit to a system bus having signal lines for expressing information units, including memory read and write requests, the system bus including a system address bus;

means, coupled to said first and to said second interface means and responsive to a write request from said system bus, for executing the write request by storing one or more information units within a memory unit at an address specified by the system address bus, said write request executing means comprising write request receiving and buffer means having a plurality of storage locations capable of storing a plurality of received write requests and associated write addresses prior to execution of the write requests;

means, coupled to said first and to said second interface means and responsive to a read request from said system bus, for executing the read request by reading one or more information units from a memory unit at a location specified by the system address bus, said read request executing means comprising read request receiving and buffer means having a plurality of storage locations capable of storing a plurality of received read requests and associated read addresses prior to execution of the read requests;

said memory control unit further comprising:

means responsive to the operation of said write request receiving and buffer means and to said read request executing means for determining, at least during a time that said read request executing means is executing a buffered read request, when a predetermined number of write requests are buffered within said write request buffer means, the predetermined number being less than a maximum possible number of buffered write requests;

means responsive to the operation of said determining means for causing said second interface means to assert a signal on said system bus when said determining means determines that the predetermined number of write requests are buffered within said write request buffer means, an assertion of said signal preventing a reception of further read or write requests from said system bus; and means responsive to the operation of said determining means for executing at least one buffered write request such that the remaining number of buffered write requests is less than the predetermined number.

23. A memory control unit as set forth in claim 22 and further comprising means, having a first input coupled to said write buffer means and a second input coupled to said read request receiving means, for comparing a received read address to write addresses stored in said write address buffer means, said comparing means having an output signal for indicating, when asserted, an occurrence of the reception of a read address within a range of addresses of one of said stored write addresses, said memory control unit further comprising means for controlling the execution of read and write requests, said controlling means being coupled to said comparing means output signal and being responsive to said comparing means output signal not being asserted for causing an execution of all buffered read requests before any buffered write requests, said controlling means further being responsive to said comparing means output signal being asserted for causing an execution of only those buffered read requests which precede a buffered read request which caused the assertion of said comparing means output signal and then causing an execution of buffered write requests.

24. A memory control unit coupled between a system bus and a main system memory for controlling the operation of the main system memory, the system bus being comprised of address signal lines for specifying addresses within the main system memory, data signal lines for conveying data units between bus connections coupled to the system bus and the main system memory, and at least one signal line for specifying whether a particular system bus transaction initiated by one of the bus connections is a main system memory read request or a main system memory write request, the memory control unit comprising:

means coupled to the system bus for receiving main system memory read requests and main system memory write requests therefrom;

means coupled to the main system memory for executing main system memory read requests and main system memory write requests;

means coupled to the receiving means for buffering a plurality of main system memory write requests, including a main system memory write address associated with each main system memory write request, prior to execution of main system memory write requests;

means coupled to the receiving means for buffering a plurality of main system memory read requests, including a main system memory read address associated with each main system memory read request, prior to execution of main system memory read requests;

means having a first input coupled to the receiving means and a second input coupled to the means for buffering main system memory write requests for comparing a received main system memory read address against all buffered main system memory write addresses, if any, to determine if a received main system memory read address has an address value within a predetermined range of address values of one of the buffered main system memory write addresses, the comparing means including means for asserting an output signal for indicating that a received main system memory read address has an address value within the predetermined range of address values of one of the buffered main system memory write addresses; and wherein the executing means has an input coupled to the comparing means output signal and is responsive to an assertion thereof for first executing in order as received all buffered main system memory read requests up to but not including the main system memory read request which was determined to be within the predetermined range of address values, then executing in order as received buffered main system memory write requests, and then executing the buffered main system memory read request which was determined to be within the predetermined range of address values.

25. A memory control unit as set forth in claim 24 wherein the comparing means includes means for executing an associative comparison between each received system memory read address and all buffered system memory write addresses, if any, to determine if the received system memory read address has an address value within a predetermined range of address values of one of the buffered system memory write addresses, the associative comparison means having an output coupled to said asserting means.

26. A memory control unit as set forth in claim 24 and further comprising:

means coupled to the system memory write request buffering means for determining when a predetermined number of system memory write requests are buffered within the system memory write request buffering means, the predetermined number being less than a maximum capacity of the system memory write request buffering means;

means responsive to the operation of the predetermined number determining means for asserting a signal on the system bus when the predetermined number determining means determines that the predetermined number of system memory write requests are buffered, an assertion of the system bus signal preventing bus connections from issuing further system memory read or system memory write requests on the system bus; and wherein the executing means is coupled to and is responsive to the operation of the predetermined number determining means for executing at least one buffered system memory write request such that the remaining number of buffered system memory write requests is less than the predetermined number.

* * * * *